M. H. AVRAM.
EFFICIENCY RECORDER.
APPLICATION FILED JAN. 23, 1914.

1,131,104.

Patented Mar. 9, 1915.
7 SHEETS—SHEET 4.

M. H. AVRAM.
EFFICIENCY RECORDER.
APPLICATION FILED JAN. 23, 1914.

1,131,104.

Patented Mar. 9, 1915.
7 SHEETS—SHEET 5.

UNITED STATES PATENT OFFICE.

MOÏS H. AVRAM, OF NEW YORK, N. Y., ASSIGNOR TO SLOCUM, AVRAM & SLOCUM, INC., OF NEW YORK, N. Y.

EFFICIENCY-RECORDER.

1,131,104.  Specification of Letters Patent.  Patented Mar. 9, 1915.

Application filed January 23, 1914. Serial No. 813,850.

*To all whom it may concern:*

Be it known that I, Moïs H. AVRAM, a citizen of the United States, and a resident of New York city, county and State of New York, have invented a new and useful Efficiency-Recorder, of which the following is a specification.

This invention relates to a device of novel construction which enables an officer of a manufacturing or other plant to exercise complete control over the various machines installed, and more particularly over their speed, their running time and periods of rest, the time required for eventual repairs, the actual output, etc.

The device is furthermore adapted to indicate to the operator of each machine the periods during which a work piece should be completed and delivered by said machine, so that by this marking of time, the actual output may be made to correspond to the theoretical output or to that guaranteed by the manufacturer of the machine. At the office or other convenient place on the other hand, there are located two counters one of which indicates the number of signals so given, while the other counter registers the number of work pieces finished by the machine during the same period. In this way, means are furnished that enable the various machines to be completely controlled relatively to their efficaciousness by the office force as well as by the machines' operators.

In the accompanying drawing: Figure 1 is a front elevation of an efficiency recorder embodying my invention, Fig. 2 a similar view with part of the frame broken away, Fig. 3 a vertical cross section on line 3—3, Fig. 1, Fig. 4 a side view of one of the recording electro-magnets and adjoining parts, Fig. 5 a plan of Fig. 4, Fig. 6 a horizontal section on line 6—6, Fig. 4, Figs. 7, 8 and 9 are similar sections on line 7—7, Fig. 4, showing the parts in different positions, Fig. 10 is a section through the drum-actuating friction clutches and coöperating parts, Fig. 11 a longitudinal section through part of the drum, Fig. 12 a cross section therethrough showing the paper before being clamped to the drum, Fig. 13 a similar section with the paper clamped to the drum, Fig. 14 a partly diagrammatic plan of the signal actuating and signal registering means, Fig. 15 an enlarged cross section on line 15—15, Fig. 14, Fig. 16 a sectional view of one of the signal actuating and signal registering electromagnets and adjoining parts, Fig. 17 a vertical cross section of Fig. 16 looking in the direction of arrows 17, Fig. 18 a similar section looking in the direction of arrows 18, Fig. 19 a wiring diagram of one of the recording electromagnets, Fig. 20 a modification of part of said diagram, Fig. 21 a side view of a modified form of the recording means, and Fig. 22 a face view of a time-sheet.

Within a suitable casing 25 is mounted a clock or other motor 26, the arbor 27 of which transmits its movement through gear wheels 28, flexible shaft 29 and spindle 30 to a pinion 31 that meshes into a beveled gear wheel 32. The latter is mounted on an axle 33 to which it is non-rotatably connected by means of a groove and feather connection 34. Axle 33 is journaled in a bearing 35 and is adapted to drive by frictional contact, a pair of shafts 36 arranged in axial alinement therewith. For this purpose each of the shafts 36 is provided with a fixed arm 37 carrying a spring-influenced stud 38 that is adapted to engage the slot 39 of a friction disk 40. The latter is loosely mounted on axle 33 between a fixed cloth-covered disk 41 and a loose cloth-covered disk 42, a spring 43 tending to maintain the parts 40, 41, 42 in frictional engagement. In lieu of directly engaging disk 42, as is the case with the left hand friction clutch (Fig. 10), the spring 43 pertaining to the right hand friction clutch, engages the beveled gear wheel 32 and thus transmits pressure to the disks of said clutch through the medium of said wheel.

Figures 11, 12, 13:
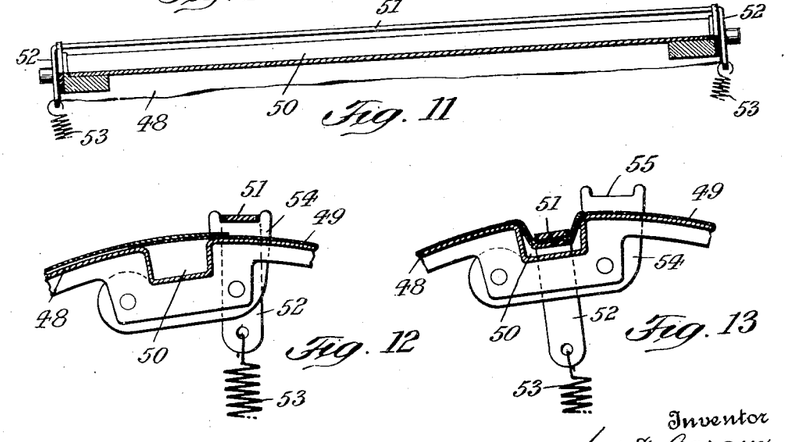

Each shaft 36 is rotatably mounted in a pair of bearings 44 extending upwardly from a slide 45 that is movable in suitable guide ways 46 of base plate 47. Intermediate bearings 44 there is secured to shaft 36 a drum 48 adapted to support the time sheet 49. For securing this sheet to the drum, the latter is provided with a longitudinal groove 50, into which the overlapping ends of the sheet are drawn by a U-shaped clamping bar 51. The shanks 52 of this bar are engaged by springs 53 that tend to draw the bar into groove 50. To facilitate the application of the time sheet to the drum, a pair of brackets 54 are shown to be secured to the ends of drum 48, said brackets being provided with recessed seats 55 into which the bar is temporarily inserted while the time sheet is laid around the drum.

The time sheet 49 which will hereinafter be more fully described is adapted to receive the desired data relating to the operation of the machines which are to be controlled by the apparatus. For each of such machines, there is provided a recording lever or member A carrying at its lower free end a stylo 56 which is adapted to draw a substantially horizontal line on the time sheet. In the drawing, each drum 48 is shown to coöperate with ten recording levers which are arranged in a row, the entire apparatus being thus adapted to control twenty machines.

Figures 4, 5, 6, 7, 8, 9, 19, 20:
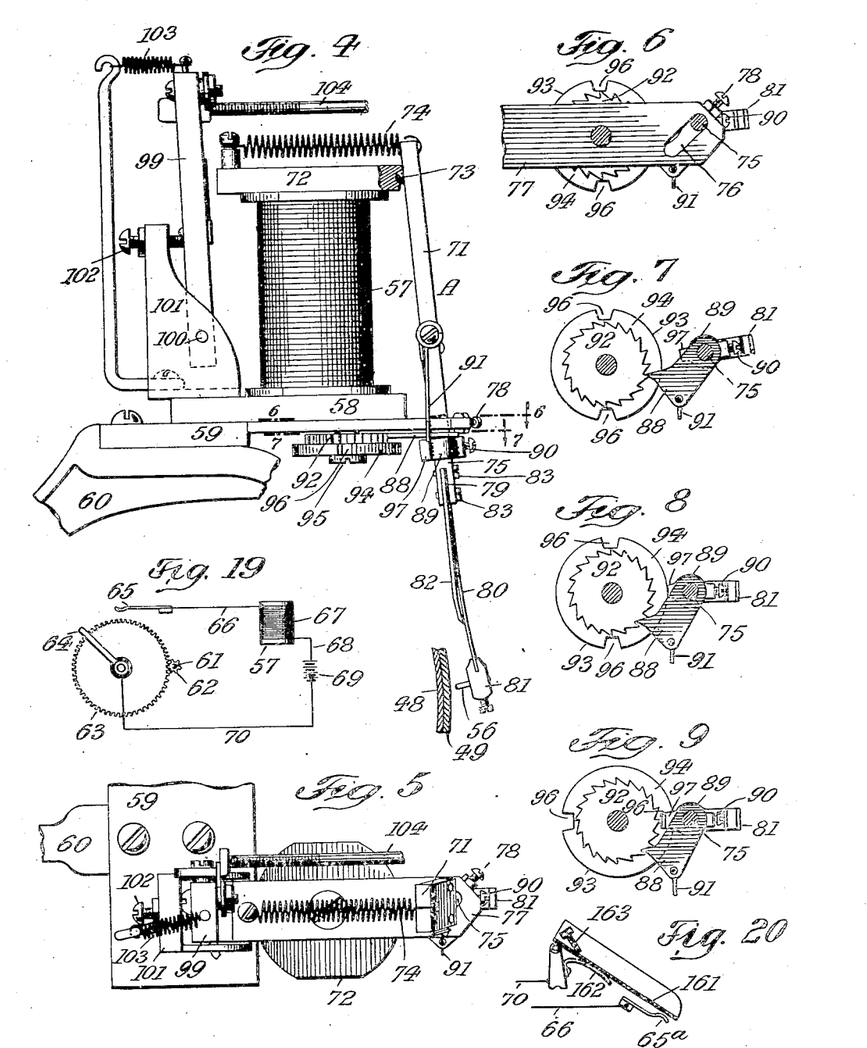
Figure 21:
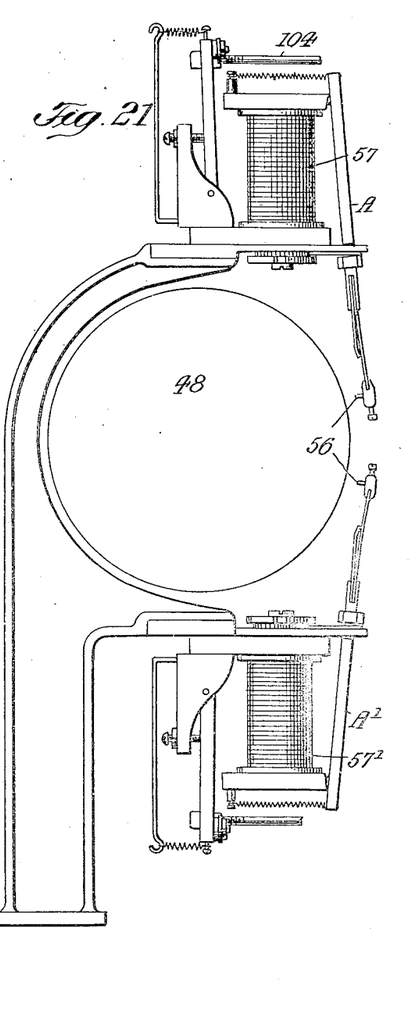

As both drums and coöperating parts are of like construction, the description of one drum will suffice. Each recording lever A is actuated by an electromagnet 57, the lower pole shoe 58 of which is secured to a longitudinal bar 59 supported by fixed brackets 60. Electromagnet 57 is adapted to be intermittently energized by the closing of a suitable contact which closing is effected by the machine to be controlled or by the article manufactured thereby. The construction and application of this contact depends entirely upon the kind of machine to be controlled, and upon the kind of control desired, i. e. whether the speed and working time or the output is to be recorded. In Fig. 19 a wiring diagram is shown for controlling the speed and working time of a shaft 61 that may form part of any machine. Upon shaft 61 is firmly mounted a pinion 62 meshing into a gear wheel 63, the ratio between wheels 62, 63 being 1 to 10. Gear wheel 63 is provided with an insulated contact finger 64 that is adapted to engage a contact spring 65 which is, by wire 66, connected to the winding 67 of electromagnet 57. Winding 67 is, by wire 68 connected to a battery 69 or other source of electricity, which is in turn connected to finger 64 by wire 70. It will thus be seen that whenever shaft 61 performs ten complete revolutions, finger 64 will engage spring 65 to close an electric circuit for energizing electromagnet 57, which will in turn cause stylus 56 to mark time sheet 49 accordingly. If on the other hand the output is to be controlled the finished articles may be consecutively discharged from the machine upon a pivoted inclined metal chute 161, Fig. 20, which is normally slightly spaced from a contact spring 65ª by means of a spring 162, said spring 65ª and chute being respectively connected to the wires 66, 70 hereinabove referred to. It will thus be seen that when a finished article such as a screw bolt 163 slides along chute 61, the latter will be lowered against the action of spring 162 to engage contact 65ª and thus close the circuit above described. For correspondingly marking sheet 49, the upper portion 71 of lever A constitutes a magnetizable armature which is connected to the upper pole shoe 72 of electromagnet 57 by a ball and socket joint 73, a spring 74 maintaining the parts 71, 72 in permanently operative engagement. The lower cylindrical end or stud 75 of lever A is received within an inclined slot 76 of an arm 77 secured to the lower side of pole shoe 58 and extending forwardly therefrom. Into the forward end of slot 76 projects the tip of an adjusting screw 78 by means of which the outward play of lever A may be regulated. A slot 79 of stud 75 receives a spring 80 the free end of which carries a head 81 to which the stylus 56 is secured. Spring 80 is shown to rest freely against a finger 82 that is also inserted into slot 79, the parts 80, 82 being held in position by screws 83. The mutual relation of the parts is such that the stylo 56 is normally slightly spaced from drum 48, the lower end of lever A being swung outward by spring 74 as clearly illustrated in Fig. 4. As soon as electromagnet 57 is energized, lever A will be attracted by pole shoe 58 and owing to its slanting movement along inclined slot 76, stylo 56 will be moved along sheet 49 in a substantially horizontal direction, thereby drawing a horizontal line 84 in the corresponding column 85 of the time sheet. As shown in Fig. 21, the sheet 49 is provided with a number of vertical columns 85 that correspond with the number of recording levers A coöperating with the drum. The time sheet is further provided with transverse lines 86 that indicate the working hours and fractions thereof, the time sheet shown comprising the hours from 6 a. m. to 6.30 p. m.

Figure 22:
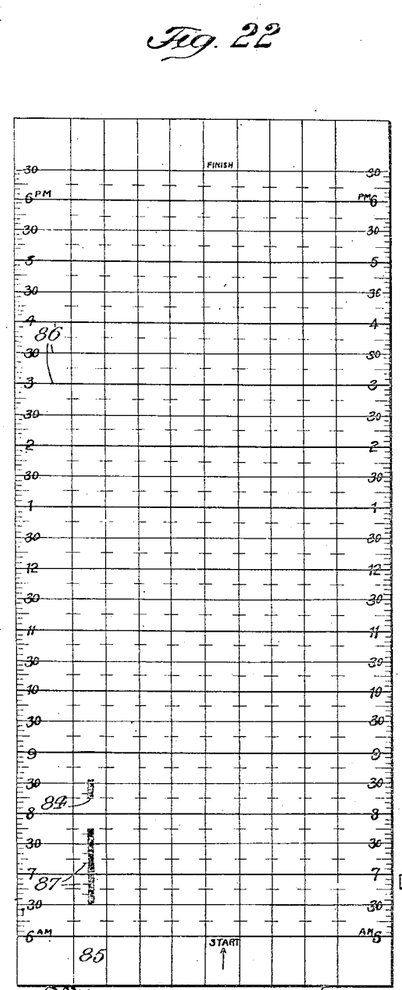

In order to facilitate the reading and counting of the lines 84 marked by each stylus on the time sheet, provisions are made for drawing at certain intervals lines 87, the length of which exceeds that of lines 84, the drawing showing every tenth line to be such a line of greater length. For this purpose, there is loosely mounted on stud 75 a pawl 88 which is supported on a collar 89 secured to said stud by screw 90. Pawl 88 is influenced by a spring 91 and engages a ratchet wheel 92, while collar 89 is adapted to engage the rim 93 of a disk 94 that is firmly secured to ratchet wheel 92, the ratchet wheel and disk being loosely mounted on a screw 95. Ratchet wheel 92 is shown to be provided with twenty teeth, while disk 94 is furnished with a pair of diametrically opposed notches 96 that are adapted to receive a tapering projection or finger 97 of collar 89. When electromagnet 57 is disenergized, the recording lever A occupies the position indicated in Figs. 4 and 7. Upon an energizing of said electromagnet, lever A is attracted until finger 97 abuts against the rim 93 of disk 94 (Fig. 8) whereby the ratchet wheel 92 is advanced for one tooth, and a short line 84 is marked on time sheet 49. After ratchet wheel has drawn nine short lines and the ratchet wheel has thus been advanced for nine teeth, one of the notches 96 has arrived opposite finger 97, so that upon the succeeding attraction of lever A, the latter will perform a correspondingly enlarged stroke so as to mark along line 87. From Fig. 22 it will be seen that the machine controlled by the second recording lever was started at 6.30 a. m. and ran continuously until 7.45, when it stopped until 8.15, etc. The recorder thus indicates for each machine, the time during which it was running and its periods of rest, the number of revolutions being also given during the running time. It is obvious however, that with machines of different character, the control desired may be entirely at variance with the one above described. Thus in lieu of recording the running time and speed of a machine, its output may be controlled as is for instance the case with screw or bolt making machines, etc., the manner in which the circuit of electromagnet 57 is closed in this case depending upon the construction of the machine.

Figure 3:
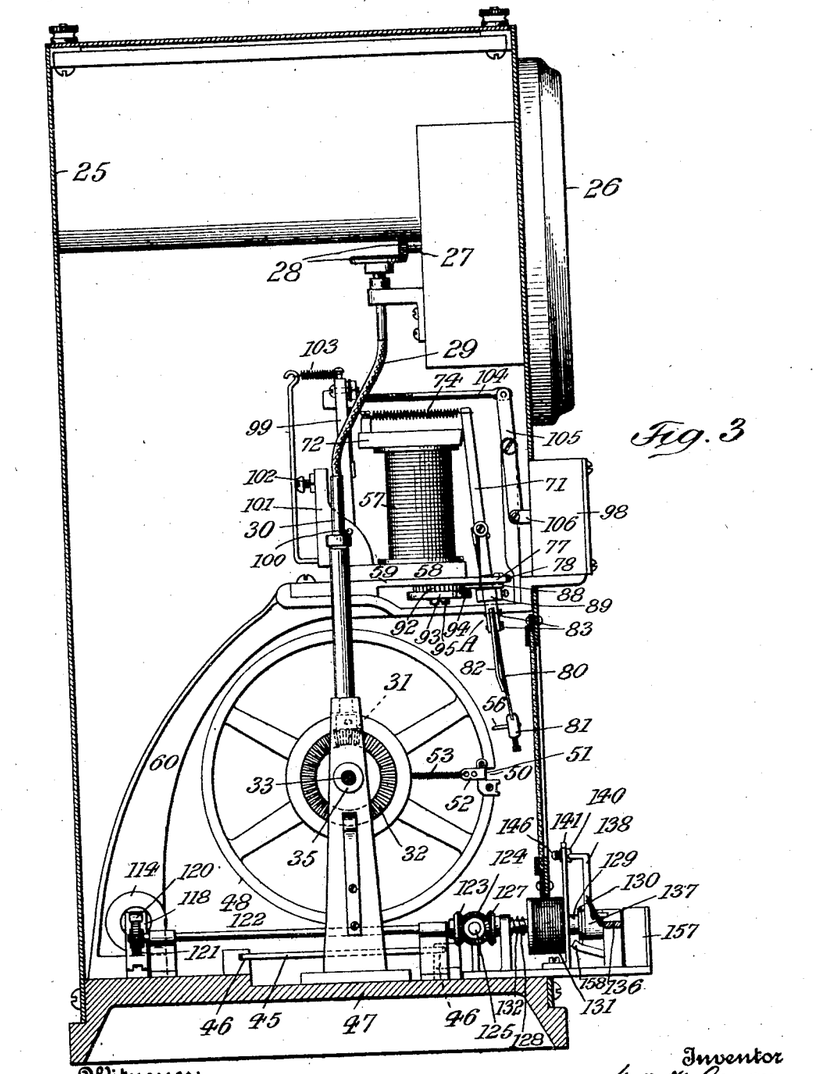

For recording the output above referred to, a counter 98, Fig. 3, is operatively connected to each electromagnet 57 so that each time the latter is energized, the counter will be advanced for one number. The counter 98 is operated by means of an armature lever 99 pivoted at 100 to a bracket 101 which is secured to bar 59 and carries a set screw 102 that regulates the stroke of lever 99. The latter is normally held against screw 102 by means of a spring 103, while upon the energizing of electromagnet 57, lever 99 is attracted by pole shoe 72. This movement of lever 99 is, by rod 104, transmitted to a two-arm lever 105 which in turn, transmits its movement to counter 98 by link 106, thereby adding one to the number previously registered by said counter. It will be seen that if my recorder is employed for controlling the running time and speed of a machine, the counter 98 will register the aggregate number of lines 84, 87 marked by the coöperating stylo 56, so that the total number of revolutions of a machine-shaft during a certain time may be quickly read off the counter.

Figures 14, 15:
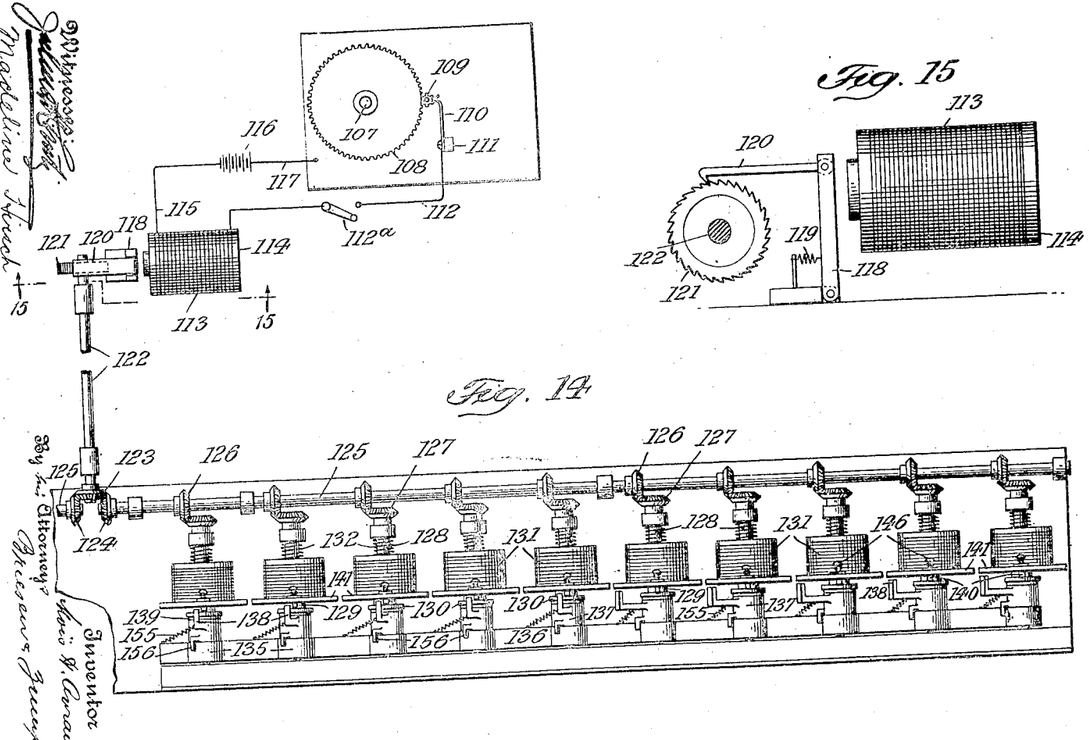

The recorder is further provided with means that visibly or audibly advise the attendant of a machine of the time in which he should normally complete the article worked. Thus if it has been ascertained by prior tests that a certain article, as for instance a screw bolt, should be finished within three minutes, a signal may be automatically given every three minutes, so that the attendant may ascertain whether he is behind in the output of his machine, without having to consult a time-piece. These means are shown to be as follows: To the arbor 107, Fig. 14, of the second hand of clock 26 is secured a toothed wheel 108 having 60 teeth, which engage the teeth of a small pinion 109 so that the latter will be advanced each second for one tooth. The teeth of pinion 109 are adapted to consecutively engage a contact spring 110 secured to the clock casing but insulated therefrom as at 111. Spring 110 is by wire 112, connected to the coil 113 of an electromagnet 114, a switch 112$^a$ being preferably interpolated in wire 112. Coil 113 is in turn, by wire 115 connected to one pole of a battery or other source of electricity 116, the other pole of which is, by wire 117, connected to the metallic clock casing. It will thus be seen that electromagnet 114 will be energized every second, thus attracting its armature lever 118 which is normally retracted from said electromagnet by a spring 119. To the free end of lever 118, Fig. 15, is pivoted a pawl 120 that engages a ratchet wheel 121 fast on one end of a spindle 122. To the other end of this spindle is firmly secured a miter wheel 123 that meshes into a pair of similar wheels 124 fast on a pair of axially alined spindles 125, of which one is provided for each drum 48, so that the description of one of said shafts likewise applies to the other shaft.

Upon spindle 125, there is mounted a plurality of miter wheels 126, each of which meshes into a similar wheel 127 of a spindle 128, the number of said last named spindles corresponding to the number of recording levers A. Each spindle 128 is telescoped by a magnetizable sleeve 129 provided with a flange or head 130 and constituting the armature of a solenoid 131. Sleeve 129 is normally pressed outward by a spring 132 and participates in the rotation thereof by a pin and slot connection 133. In axial alinement with spindle 128 is arranged an axle 134 firmly mounted in a bearing 135 of a fixed longitudinal bar 136. Upon axle 134 is loosely mounted the hub 137 of a contact finger 138, said hub participating in the rotation of sleeve 129 and spindle 128 by frictional contact between head 130 and hub 137, a friction disk 139 being preferably interposed between the parts 130, 137. Finger 138 is adapted to engage a contact 140 which is adjustably mounted on the sector-shaped extension 141 of a bracket 142, which bracket is made of insulating material and also serves for supporting solenoid 131. Contact 140 is provided with a stud 143 that is movable within a curved slot 144 of extension 141 and may be frictionally held in position by means of a spring 145 encircling a screw 146 that is tapped into said stud. Concentric with slot 144, there is provided on extension 141, a scale 147 shown to comprise four minutes, although it is obvious that it may be made for any other period of time. Screw 146 is, by wire 148, connected to signaling means such as an electric light bulb 149 which is in turn, by wire 150 connected to one pole of a battery or other source of electricity 151. The other pole of this source is, by wire 152, connected to the coil of solenoid 131 which is in turn, by wire 153 connected to the metallic bar 136 and thus to finger 138, a switch 154 being preferably interpolated in said wire. The finger 138 is engaged by spring 155 that tends to tilt it into its zero position, the stroke of the finger being limited by an abutment 156 provided on hub 137 and adapted to engage bar 136. The relative strength between springs 132 and 155 should be such that when solenoid 131 is disenergized, the spring 132 produces such a frictional contact between the parts 130, 139, 137 as to cause finger 138 to participate in the rotation of sleeve 129, thus overcoming the action of spring 155. As soon, however, as solenoid 131 is energized, its armature 129, 130 will be drawn toward the left (Fig. 16) thereby relieving hub 137 of axial pressure and permitting spring 155 to return finger 137 to its zero position.

Figures 10, 16, 17, 18:
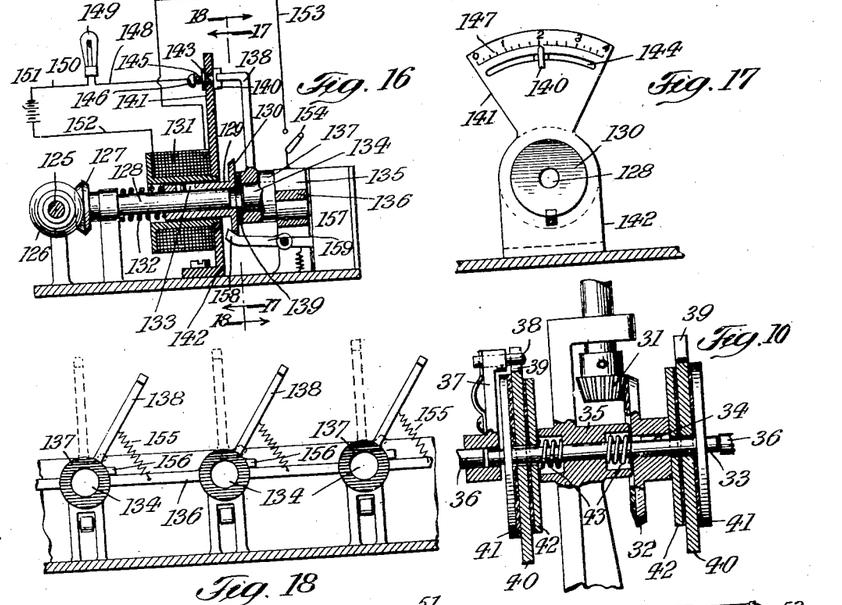

In Fig. 17, contact 140 is shown to be set to the position "2," meaning that the particular article manufactured on the machine should require for its completion not more than two minutes. If the machine is started and switches 112ª, 154 are closed, the lamp 149 is flashed every two minutes in the following manner: As electromagnet 114 is energized every second, owing to the closing of contacts 109, 110, an intermittent rotation will be imparted to spindle 122 by the ratchet mechanism described, said rotation being transmitted to spindles 125, 128, and consequently to finger 138, the solenoid 131 being now disenergized. After two minutes have thus elapsed, finger 138 engages contact 140 thereby closing the above described circuit which simultaneously energizes solenoid 131 and lights lamp 149. Owing to the energizing of solenoid 131, its armature 129, 130 is attracted and spring 155 is permitted to return finger 138 to its zero position, thus interrupting the previously closed circuit, whereupon the operation described is repeated and such repetition continued as long as switch 154 remains closed.

In addition to the signal given by lamp 149, a counter 157 is provided, which is advanced for one unit each time solenoid 131 is energized. For this purpose, head 130 is engaged by the slanting end 158 of one arm of spring-influenced two-arm lever 159, the other arm of which actuates the counter. It will thus be seen, that the counter 157 registers the aggregate number of the articles that should have been completed during a certain period of time, while the counter 98 registers the aggregate number of articles that have in fact been finished. In practice the switch 112ª is coupled in suitable manner to the starting mechanism of the machine (not shown) so that the lamp 149 and counters 157 are not operated while the machine is at a standstill for one or the other reason.

Figure 1:
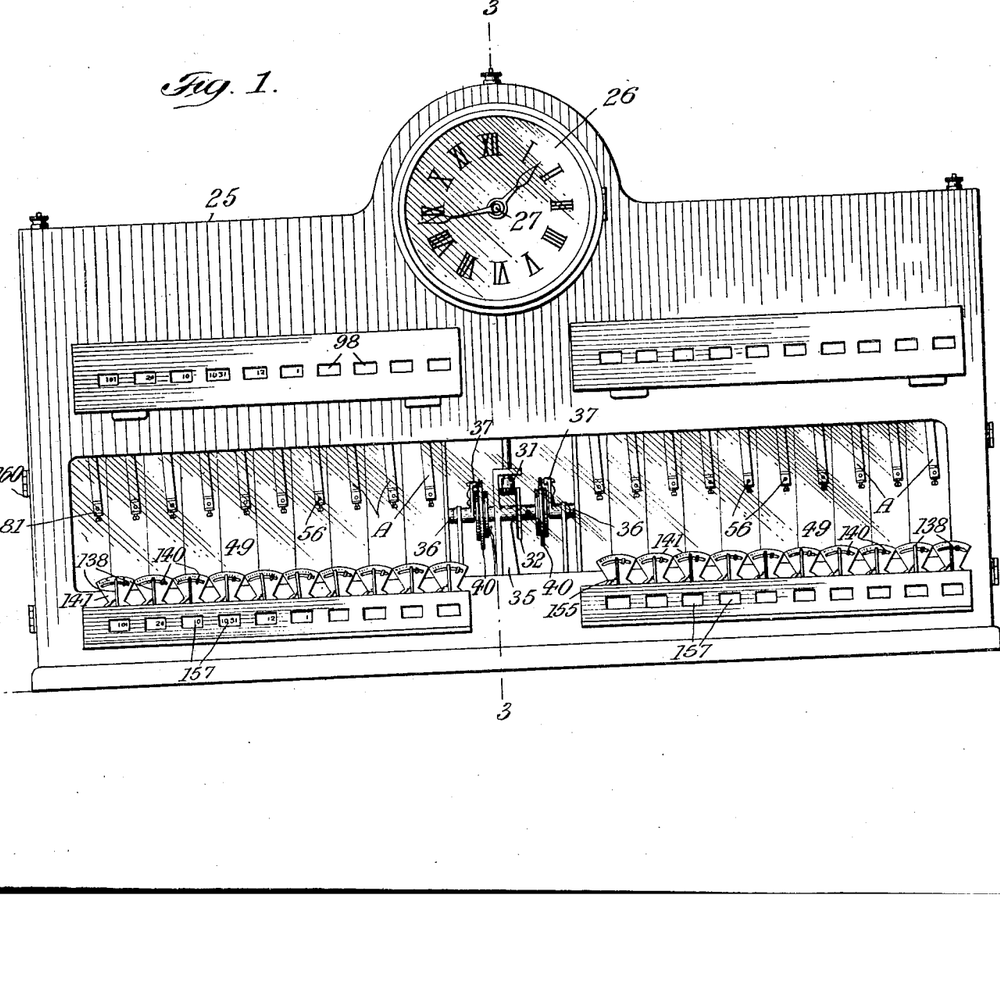
Figure 2:
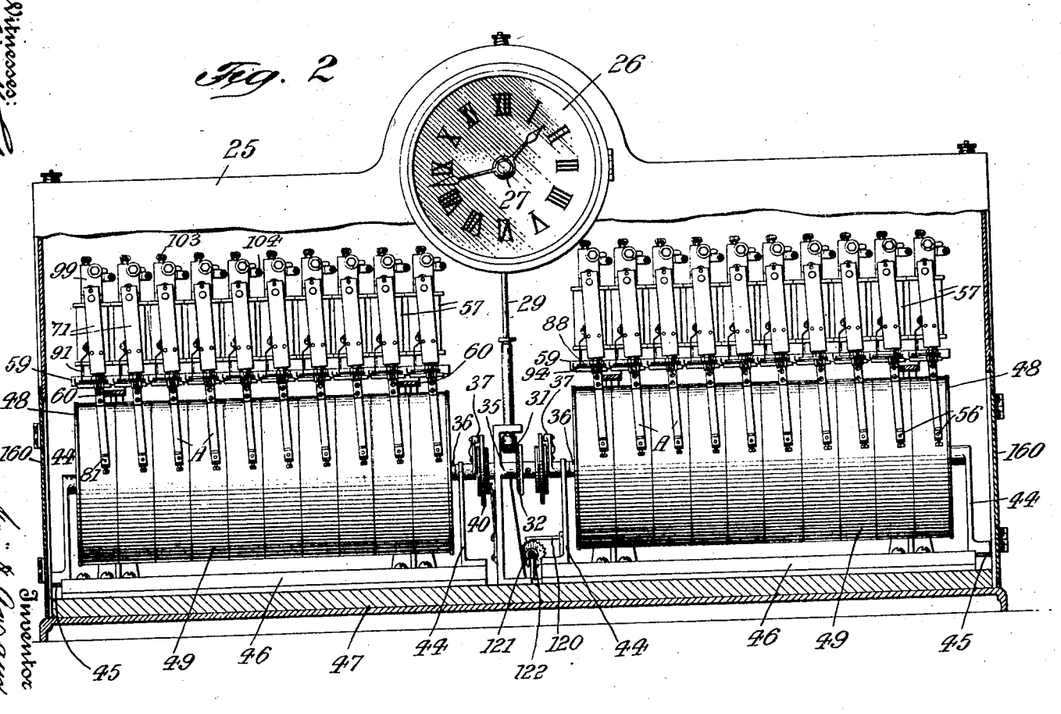

In order to economize space, a lower set of electromagnets $57^1$ and recording levers $A^1$ may be added to the set of electromagnets 57 and recording levers A above described, as illustrated in Fig. 21. The elements of the upper and lower sets should be arranged in staggering order, so that in this way a drum 49 of the same size as shown for instance in Fig. 2, may be utilized for controlling twenty machines in lieu of but ten machines. As the operative mechanism of both sets is perfectly alike, a further description of Fig. 21 is deemed unnecessary.

If it is desired to remove a marked time sheet and insert a fresh one, a corresponding door 160 of casing 25 is opened, slide 45 together with drum 48 is withdrawn from the casing, and bar 51 is lifted and hung in seats 55, whereupon the marked time sheet is removed. The fresh sheet is then laid around the drum in such a manner that its ends overlap groove 50 and bar 51 is returned to its initial position to draw such overlapping ends into the groove, thereby tightening the sheet around the drum.

It will be seen that my efficiency recorder affords reliable means for controlling the working as well as the output of a machine. In this way the attendant of the recorder may not only ascertain at any time the number of machines running, the speed and the length of stopping time, but he may also ascertain at one glance whether a machine is up to or behind in its production. In this way valuable and effective means are provided for controlling the condition and operation of the several machines as well as the alertness of their attendants.

I claim:

1. An efficiency recorder of the class described comprising a clock, a shaft controlled thereby, an axle intergeared with said shaft, a friction clutch comprising relatively fixed and loose members that are both carried by the axle, an axially removable spindle adapted to be coupled to the loose clutch-member, a drum carried by the spindle, a time sheet adapted to be clamped to said drum, and a recording member adapted to engage said sheet.

2. An efficiency recorder of the class described comprising a clock, a shaft controlled thereby, an axle intergeared with said shaft, a friction clutch comprising relatively fixed and loose members that are both carried by the axle, a slide, a spindle rotatably supported thereby and adapted to be coupled to the loose member of the friction clutch, a drum carried by the spindle, a time sheet adapted to be clamped to said drum, and a recording member adapted to engage said sheet.

3. An efficiency recorder of the class described comprising a clock, a flexible shaft controlled thereby, an axle intergeared with said shaft, a friction clutch arranged at each end of said axle, each clutch comprising relatively fixed and loose members that are both carried by the axle, a pair of axially removable spindles adapted to be coupled to the loose clutch-members, drums carried by the spindles, time sheets removably secured to the drums, and recording members adapted to engage said sheets.

4. An efficiency recorder of the class described comprising a clock, a shaft controlled thereby, an axle intergeared with said shaft, a pair of slides, spindles rotatably supported by the slides and arranged in alinement with the axle, friction clutches adapted to operatively connect the spindles to the axle, drums carried by the spindles, time sheets removably secured to the drums, and recording members adapted to engage said sheets.

5. An efficiency recorder comprising a clock, a shaft controlled thereby, a spindle frictionally connected to said shaft, a grooved drum carried by the spindle, a time sheet encircling the drum and having overlapping ends, a spring-influenced clamping bar adapted to draw said overlapping ends into the drum-groove, a seat arranged sidewise of the groove and adapted to support the bar during an exchange of the time sheet, and a recording member adapted to engage said sheet.

6. An efficiency recorder comprising a clock, a time sheet adapted to be advanced thereby, an electromagnet, means actuated by the machine to be controlled for intermittently energizing said electromagnet, a recording lever controlled by the electromagnet and adapted to engage the time sheet, a counter, and means independent of said lever and also controlled by the electromagnet for actuating said counter.

7. An efficiency recorder comprising a clock, a time sheet adapted to be advanced thereby, an electromagnet, means actuated by the machine to be controlled for intermittently energizing said electromagnet, a recording lever controlled by one pole of said electromagnet and adapted to engage the time sheet, a counter, and means controlled by the other pole of the electromagnet for actuating said counter.

8. An efficiency recorder of the class described comprising a signaling device adapted to perceivably announce intervals at which machine-worked articles should normally be delivered by said machine, and means for indicating the aggregate number of said articles actually so delivered.

9. An efficiency recorder of the class described comprising a motor, a signaling device adapted to be intermittently actuated by said motor and perceivably announcing intervals at which machine-worked articles should normally be delivered by said machine, and means also actuated by said motor for indicating the aggregate number of said articles actually so delivered.

10. An efficiency recorder of the class described comprising a motor, a movable contact operated thereby, a fixed contact adapted to be engaged by the movable contact, and a signaling device in circuit with said contacts and adapted to perceivably announce intervals at which machine-worked articles should normally be delivered by said machine.

11. An efficiency recorder of the class described comprising a motor, a movable contact operated thereby, a fixed contact adapted to be engaged by the movable contact, a signaling device in circuit with said contacts and adapted to perceivably announce intervals at which machine-worked articles should normally be delivered by said machine, and a counting device also in circuit with said contacts for registering the aggregate number of said articles actually so delivered.

12. An efficiency recorder of the class described comprising a motor, a contact finger, a friction coupling between said motor and finger, an adjustable contact adapted to be engaged by said finger, and a signaling device in circuit with said contact finger and adjustable contact.

13. An efficiency recorder of the class described comprising a motor, a contact finger, a friction coupling between said motor and finger, an adjustable contact adapted to be engaged by said finger, and a signaling device and a counting device in circuit with said contact finger and adjustable contact.

14. An efficiency recorder of the class described comprising a motor, a solenoid, a spring-influenced movable contact, a friction coupling between said motor and movable contact, a fixer contact adapted to be engaged by the movable contact, and means controlled by said contacts for energizing the solenoid, thereby opening the friction coupling.

15. An efficiency recorder of the class described comprising a motor, a solenoid, a spring-influenced movable contact, a friction coupling between said motor and movable contact, a fixed contact adapted to be engaged by the movable contact, a counter, and means controlled by said contacts for energizing the solenoid, thereby opening the friction coupling and actuating the counter.

16. An efficiency recorder of the class described comprising a signaling device adapted to indicate intervals at which machine-worked articles should normally be delivered by said machine.

17. In an efficiency recorder of the class described, an electromagnet, means actuated by the machine to be controlled for intermittently energizing said electromagnet, recording means controlled by said electromagnet, a counter, and means independent of said recording means and also controlled by the electromagnet for actuating the counter.

18. In an efficiency recorder of the class described, a time sheet, an electromagnet, means actuated by the machine to be controlled for intermittently energizing said electromagnet, a recording member controlled by the electromagnet and adapted to engage said time sheet, a counter, and an additional member independent of the recording member and also controlled by the electromagnet for actuating the counter.

19. In an efficiency recorder of the class described, a rotary drum, a time sheet engaged thereby, an upper set of electromagnets, a lower set of electromagnets, and recording members adapted to engage the time sheet, one of such members being provided for and controlled by each electromagnet of the upper and lower sets, the recording members controlled by the upper set of electromagnets being staggeringly arranged with relation to the recording members controlled by the lower set of electromagnets.

MOÏS H. AVRAM.

Witnesses:
ARTHUR E. ZUMPE,
FRANK V. BRIESEN.